US006971841B2

(12) United States Patent
Care

(10) Patent No.: US 6,971,841 B2
(45) Date of Patent: Dec. 6, 2005

(54) CELLULAR MATERIALS

(75) Inventor: Ian C D Care, Derby (GB)

(73) Assignee: Rolls-Royce plc, London (GB)

( * ) Notice: Subject to any disclaimer, the term of this patent is extended or adjusted under 35 U.S.C. 154(b) by 82 days.

(21) Appl. No.: 10/384,719

(22) Filed: Mar. 11, 2003

(65) Prior Publication Data

US 2004/0022625 A1 Feb. 5, 2004

(30) Foreign Application Priority Data

Mar. 15, 2002 (GB) .......................................... 0206136

(51) Int. Cl.[7] .............................................. F01D 21/00

(52) U.S. Cl. ....................... 415/9; 415/119; 415/174.4; 415/200

(58) Field of Search ......................... 415/9, 119, 173.1, 415/173.4, 174.4, 200, 220; 60/223.3, 226.1, 39.091

(56) References Cited

U.S. PATENT DOCUMENTS

| | | | | | |
|---|---|---|---|---|---|
| 3,481,427 | A | * | 12/1969 | Dobbs et al. | 415/119 |
| 3,819,009 | A | * | 6/1974 | Motsinger | 181/292 |
| 4,377,370 | A | * | 3/1983 | Porcelli | 415/9 |
| 4,541,776 | A | * | 9/1985 | Schon | 415/200 |
| 4,699,567 | A | * | 10/1987 | Stewart | 415/200 |
| 4,858,721 | A | | 8/1989 | Autie | |
| 4,867,639 | A | * | 9/1989 | Strangman | 415/173.4 |
| 6,053,696 | A | * | 4/2000 | Roberts | 415/9 |
| 6,059,524 | A | * | 5/2000 | Costa et al. | 415/9 |
| 6,123,170 | A | | 9/2000 | Porte | |
| 6,290,022 | B1 | * | 9/2001 | Wolf et al. | 181/292 |
| 6,575,694 | B1 | * | 6/2003 | Thompson et al. | 415/9 |
| 6,619,913 | B2 | * | 9/2003 | Czachor et al. | 415/119 |

FOREIGN PATENT DOCUMENTS

| | | | |
|---|---|---|---|
| EP | 0952310 | A | 10/1999 |
| GB | 1268777 | P | 3/1972 |
| GB | 1274343 | P | 5/1972 |
| GB | 1498189 | P | 1/1978 |
| GB | 2076066 | A | 11/1981 |
| GB | 2131099 | A | 6/1984 |
| GB | 2314526 | A | 1/1998 |
| GB | 2364366 | A | 1/2002 |
| JP | 7324602 | A | 12/1995 |

* cited by examiner

*Primary Examiner*—Edward K. Look
*Assistant Examiner*—Igor Kershteyn
(74) *Attorney, Agent, or Firm*—W. Warren Taltavull; Manelli Denison & Selter PLLC

(57) ABSTRACT

A structural member comprises a main body formed from a cellular material. The structural member may be a casing for a rotary assembly e.g. a fan of a gas turbine engine. The main body may incorporate strengthening ribs and conduits and may have a random or graduated arrangement of different sized cells forming the cellular material. A recess may be defined on the radially inner face of the main body to receive an abradable material suitable for forming a seal with the blades of the fan.

5 Claims, 5 Drawing Sheets

CELLULAR MATERIALS

FIELD OF THE INVENTION

This invention relates to cellular materials. More particularly, but not exclusively, the invention relates to casings formed from cellular materials, for example engine casings such as gas turbine engine casings. The invention also relates to uses of cellular materials.

BACKGROUND OF THE INVENTION

Certain constructions of gas turbine engine are provided with a fan in the forward portion of the engine. A casing surrounds the fan and is required to perform several functions, namely to reduce the noise from the fan, to perform blade containment in the event of a failure of one or more of the blades, to support accessories mounted on the fan and to provide sealing for the airflow through the fan.

SUMMARY OF THE INVENTION

According to one aspect of this invention there is provided a structural member comprising a main body formed from a cellular material, and means for mounting the main body on or around a further member.

The structural member may be a casing, which may be a casing for a rotary assembly of a gas turbine engine and is preferably a casing for a fan, a casing for a compressor or a casing for a turbine. Preferably, a strengthening component is provided on or in the main body.

According to another aspect of this invention there is provided a load supporting member comprising a main body formed of a cellular material and a strengthening component provided in the main body.

According to another aspect of this invention there is provided a projectile containment device comprising a main body formed of a cellular material, and means for mounting the main body in a region to contain the projectile.

Preferably a strengthening component is provided on the main body.

According to another aspect of this invention, there is provided the use of a cellular material in the manufacture of a device for absorbing energy, comprising forming a main body from the said cellular material and thereafter mounting the main body in a region to absorb energy.

The cellular material is preferably a cellular metal, for example, copper, chromium, enriched aluminium, titanium. Although it may be a cellular ceramic or a combination of a cellular metal and a cellular ceramic.

The energy to be absorbed by the main body is preferably in the form of a projectile, for example part, or the whole of, a blade of a fan, compressor or turbine of a gas turbine engine.

In one embodiment, the projectile containment device may be constructed to absorb the energy of a projectile, and to capture the projectile in the main body. In another embodiment, the projectile containment device may be constructed to reduce the energy of the projectile, for example for capture by another system or body.

Preferably, at least part of the strengthening component is provided inside the main body. The strengthening component may be elongate.

Preferably a plurality of said strengthening components are mounted on or in the main body. Preferably, the, or each, strengthening component is so mounted during formation of the main body.

The, or each, strengthening component may be in the form of an elongate strengthening member which may be in the form of a rib. The, or each, strengthening member may have a T-shaped cross-section. The strengthening member may be attachable to other components. Alternatively the, or each, strengthening member may be in the form of a conduit, along which a fluid may pass or a cable may extend. The, or each, conduit is preferably in the form of a tube which may have a substantially circular cross-section.

Alternatively, where there are a plurality of said strengthening components, some may be in the form of ribs, each of which may be as aforesaid, and others may be in the form of conduits, each of which may be as aforesaid.

The main body may be provided with barrier means. The barrier means may be a barrier to a flow of gas through the main body, and/or may be a barrier to noise. The barrier means may comprise a layer of a further material on the main body. The further material may be of metal or, preferably, the further material is a non-metallic material, which may be capable of absorbing sound. For example, the barrier means may be formed of an elastomeric material. Where the barrier means is capable of absorbing sound, the barrier mean, may be provided on the main body by dipping the main body in a melt or a solution of the said further material. Where the said further material is provided at an outer region of the main body the material maybe provided simply by dipping the main body into the material up to the required level. Where the said further material is provided at an inner region of the main body, the material may be provided by dipping the main body into the material, allowing solid material to form and thereafter dissolving material from any regions of the main body where the material is not required.

Where the barrier means is formed of a metal, it may be provided on the main body by spraying for example, by plasma spray coating or by providing a solid layer of the material in the main body during formation thereof.

Where the barrier means is formed of a sound absorbing material, for example an elastomeric material, the barrier member may be provided on the main body by being applied thereto after formation of the main body, e.g. by dipping the main body in a melt, or solution, of the material. In the former case, the material is allowed to cool and solidify, and in the latter case, the solvent is allowed to evaporate.

The barrier means may include a sound absorption arrangement. The sound absorption arrangement may comprise different sized cells of the cellular material. The different sized cells are preferably randomly arranged in the main body. Alternatively, there may be a graduation of sizes of the cells from one surface of the main body to the opposite surface.

In one embodiment, in the form of a casing, for example for a gas turbine engine, such as a casing for rotary apparatus of the engine, preferably the fan, the casing may be generally annular in configuration and may include means for mounting thereon an abradable material. The abradable material is suitably a material for creating a seal between the rotating blades and the edges of the casing. In the embodiment concerned, the rotating blades wear away a track in the abradable material.

The inner surface of the main body may define a recess preferably an annular recess, into which the abradable material is provided. The abradable material may be applied to the main body by being sprayed thereon, for example by plasma spray coating.

A containment means may be provided on the main body, whereby kinetic energy of a projectile striking the main body is absorbed by main body. The containment means may hold the projectile on the main body.

The containment means may comprise a containment member extending across the main body generally parallel to a surface to be struck by the projectile. Preferably, the containment member extends across a surface opposite the surface struck by the projectile.

At least one elongate rib may extend from the containment member towards the surface to be struck by the projectile. Preferably a plurality of elongate rib external from the containment member towards the surface to be struck. Alternatively, or in addition, the containment means may include at least one cable spaced from the containment member between the containment member and the surface to be struck by the projectile. Preferably the containment means includes a plurality of cables, spaced from the containment member between the containment member and the surface to be struck.

In a further embodiment the thickness of the main body may be calculated such that said thickness is sufficient to absorb kinetic energy of a projectile and hold said projectile in the main body.

Where the structural member is in the form of a casing of a rotary assembly of a gas turbine engine, the containment member may extend circumferentially around the main body. The, or each, cable may extend circumferentially around the main body.

In one embodiment, when a blade fails in a rotary assembly of a gas turbine engine, the failed or broken part of the blade may strike the main body. In this embodiment the cellular structure of the main body collapses, as the failed part of the blade passes through the main body and the kinetic energy of the failed part of the blade is absorbed by the collapse of the cellular structure.

According to another aspect of this invention there is provided a method of forming a structural member comprising arranging a plurality of beads of a polymeric material in a mould, said beads being of different sizes, applying heat to said beads to at least partially fuse the beads to one another to provide a foam precursor, providing a foamable material on the fused beads to provide structural member having a main body of a cellular material having cells of different sizes. Preferably, the mould is rotated at least during the step of providing the foamable material. Advantageously, the foamable material is a metallic or ceramic material.

The beads of the polymeric material are preferably randomly arranged in the mould to provide a structural member having a main body in which the different sized cells are randomly arranged in the main body. Alternatively the beads of the polymeric material may be arranged in a graduated array in the mould to provide a structural member having a main body in which the different sized cells are arranged in a graduated array in the main body.

The material may be a metallic or ceramic material or may be a combination of a metallic and a ceramic material, and may be deposited on the foam precursor by vapour phase deposition. Alternatively, the material may be deposited on the foam precursor by electrolytic or chemical processes, for example by being electrolytically or chemically grown.

The foam precursor may be removed by burning off said foam precursor, or by chemical removal, for example by dissolving the foam precursor.

BRIEF DESCRIPTION OF THE DRAWINGS

Embodiments of the invention will now be described by way of example only, in reference to the accompanying drawings, in which.

DETAILED DESCRIPTION OF THE INVENTION

Figure 1:
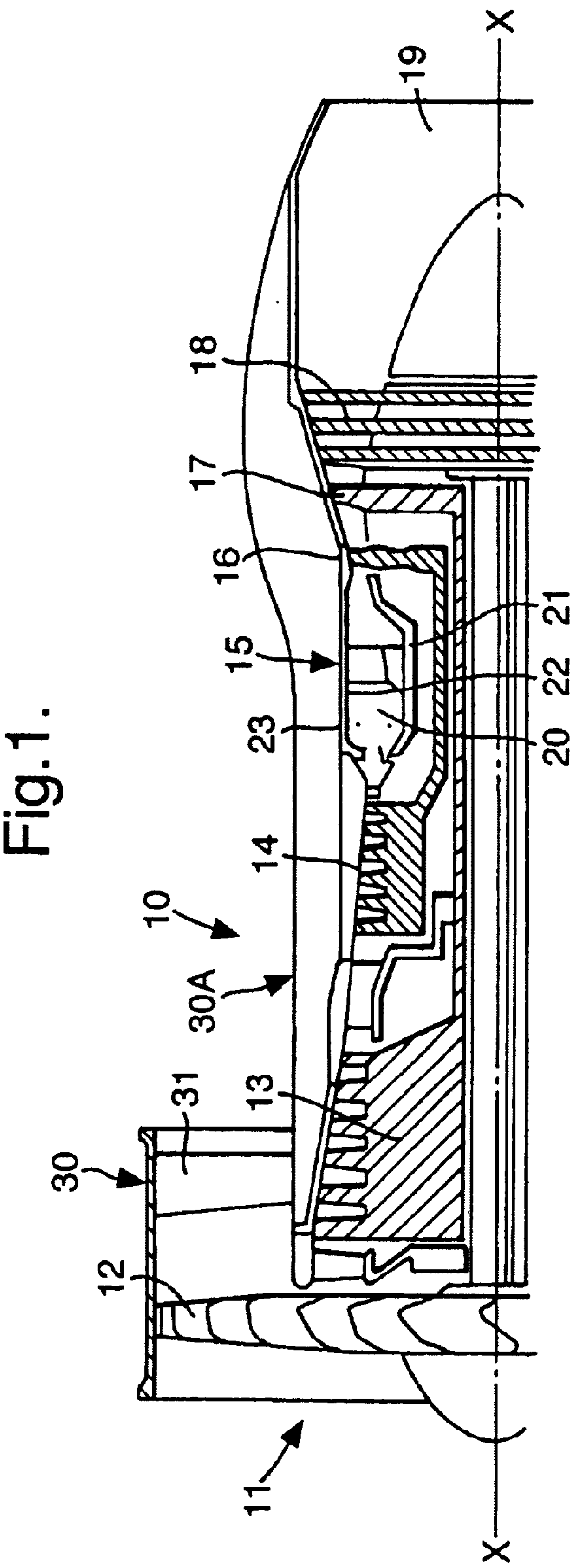
FIG. 1 is a sectional side view of the upper half of a gas turbine engine.

With reference to FIG. 1, a ducted fan gas turbine engine generally indicated at 10 has a principal axis X—X. The engine 10 comprises, in axial flow series, an air intake 11, a propulsive fan 12, an intermediate pressure compressor 13, a high pressure compressor 14, combustion equipment 15, a high pressure turbine 16, and intermediate pressure turbine 17, a low pressure turbine 18 and an exhaust nozzle 19.

The gas turbine engine 10 works in the conventional manner so that air entering the intake 11 is accelerated by the fan to produce two air flows: a first air flow into the intermediate pressure compressor 13 and a second air flow which provides propulsive thrust. The intermediate pressure compressor 13 compresses the air flow directed into it before delivering that air to the high pressure compressor 14 where further compression takes place.

The compressed air exhausted from the high pressure compressor 14 is directed into the combustion equipment 15 where it is mixed with fuel and the mixture combusted. The resultant hot combustion products then expand through, and thereby drive, the high intermediate and low pressure turbine 16, 17 and 18 before being exhausted through the nozzle 19 to provide additional propulsive thrust. The high, intermediate and low pressure turbines 16, 17 and 18 respectively drive the high and intermediate pressure compressors 14 and 13 and the fan 12 by suitable interconnecting shafts.

Figure 2:
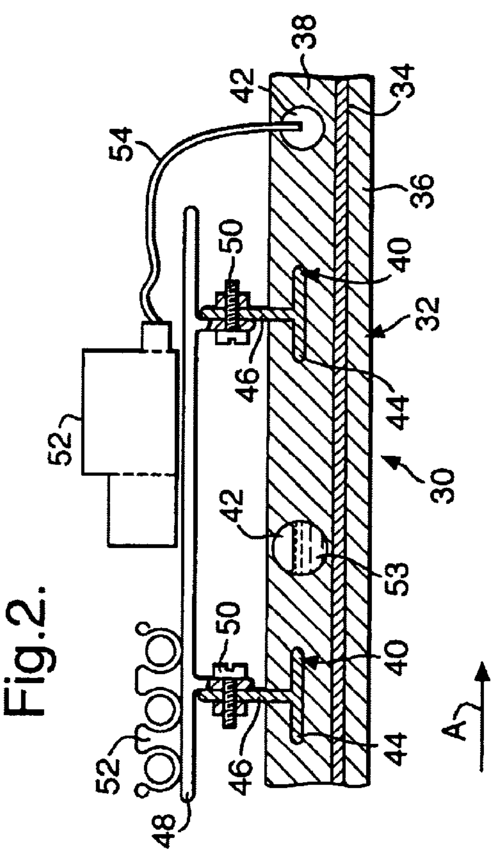

The fan 12 is circumferentially surrounded by a structural member in the form of a fan casing 30. In FIG. 2, there is shown a side view of a section of the fan casing 30. The arrows A indicate the direction of flow of air through the fan 12. The intermediate and high pressure compressors 13,14, the combustion equipment 15, and the high, intermediate and low pressure turbines 16, 17 and 18 are contained within a main engine casing 30A. The fan casing 30 is attached to the main engine casing 30A by means of a plurality of radially extending outlet guide vanes 31.

The fan casing 30 comprises an annular main body 32 which is formed from a cellular material in the form of a cellular metal, or metal matrix foam which is made from a suitable metal such as for example aluminium or titanium. A fan casing is required to perform several functions, namely to reduce sound, to contain any failed fan blades, to support accessories thereon, and to provide sealing for the air flow through the fan. FIG. 2 shows part of an embodiment of a fan casing that includes an annular sound reducing layer 34 in the main body 32. The layer 34 may be formed of a metallic material, which is formed in the main body 32 during casting of the main body 32. Alternatively, the layer may be another material capable of forming a barrier which may also have sound alternating properties. An advantage of the use of material to form sound alternating barriers is that they also serve to reduce vibration.

The layer 34 effectively divides the main body 32 into two regions. The first or radially inner region 36 acts to suppress noise from the fan; the noise emitted by the rotating fan being absorbed by the layer 34. The main body 32 also comprises a second or radially outer region 38, in which strengthening components are provided. The strengthening components comprise ribs 40 having a generally T-shaped cross-section, and conduits in the form of pipes 42 having a generally circular cross-section. The ribs 40 and the pipes 42 maybe incorporated into the main body 32 during the formation thereof.

The ribs 40 have a first part 44 which performs the function of strengthening the main body 32 and securing the rib in the main body 32, and a second part 46 extending generally at right angles to the first part 44 so that the second part 46 extends radically outwardly from the first part 44. The second part 46 is provided so that other accessories for the engine can be attached thereto. For example support raft 48 is secured to the outwardly extending parts 46 of two adjacent ribs 40 by the means of fastening means in the form of nuts and bolts 50, or other fixing known in the art. The further components 52 are thereafter mounted on the support raft 48 as shown. The pipes 42 can be used to allow the transport of fluid therethrough, or to carry, for example, electric cables 54.

Figure 3:
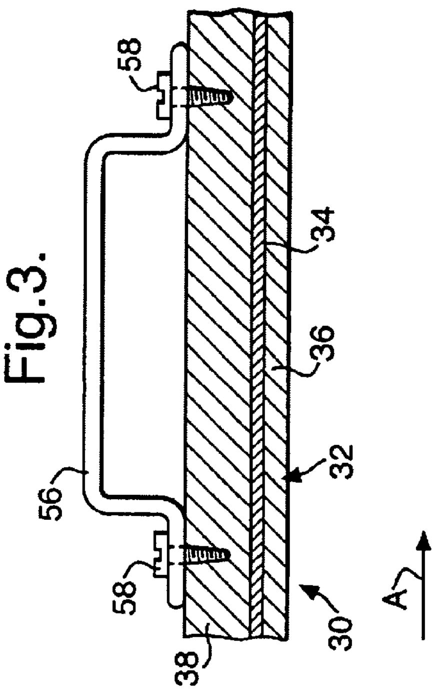
FIGS. 2 to 5 are sectional side views of different embodiments of part of a casing for a fan of a gas turbine engine.

Referring to FIG. 3, there is shown another part of the casing 36 shown in FIG. 2, comprising the layer 34 which divides the main body 32 into first and second region 36, 38 respectively, and having mounted thereon, by means of self tapping screws 58, a bracket 56. The screws 58 are screwed directly into the second region 38 of the main body 32 of the fan casing 30. The bracket 56 can be used to support further components (not shown) thereon.

Figure 4B:
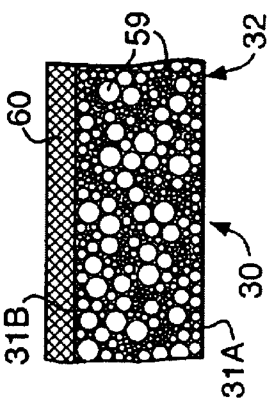
Figure 4A:
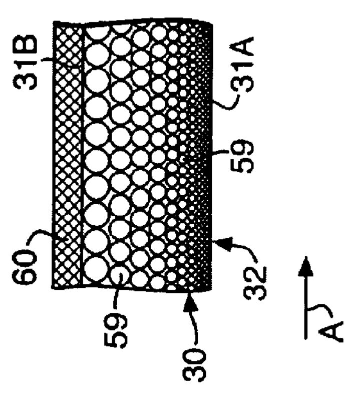

FIGS. 4A and 4B show two examples of the structure of a cellular metal used for noise reduction in a further casing. In FIG. 4A, the main body 32 of the fan casing 30 is formed of a cellular metal having cells 59 of different sizes, with the sizes of the cells 59 being graduated in size. In FIG. 4A the smallest cell size is adjacent the radially inner surface 31A of the casing 30. The sizes of the cells 59 increase gradually in a radially outer direction and the largest cell size is provided adjacent the radially outer surface 31B of the fan casing 30. In FIG. 4B, the cells 59 of different sizes are substantially randomly mixed.

In each of FIGS. 4A and 4B, a layer 60 of an air impervious material is provided over the radially outer surface of the main body 32. The layer 60 may be an elastomeric layer which could also assist in noise reduction.

It is believed that the provision of different sized cells 59 assists in noise reduction by containing within them air which will vibrate at a respective natural frequency, dependent upon the size of the respective cell 59. The noise generated by the operation of the fan 12 is made up of many different frequencies and the different sizes of the cells 59 are selected such that the air contained in the cells 59 resonates at the frequencies of the noise generated by the fan. The resonating of the air in the cells 59, absorbs the sound energy emitted by the fan thereby preventing transmission of the noise beyond the fan casing 30.

A fan casing 30 having a construction as shown in FIGS. 4A and 4B can be manufactured by an adaptation of a known method of manufacturing cellular foams.

Figure 6:
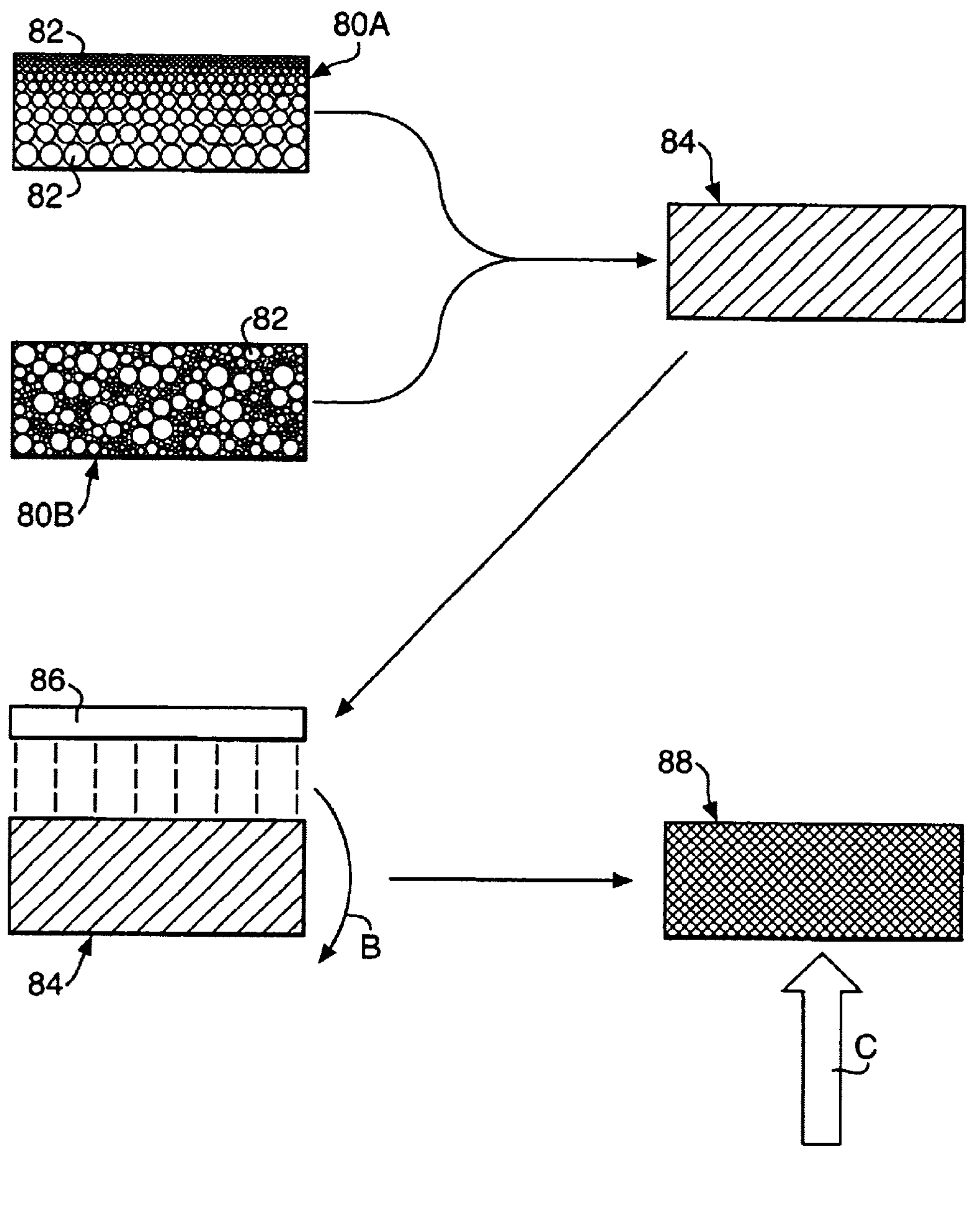
FIG. 6 is a schematic diagram representing the steps in a moulding process.

FIG. 6 shows schematically such a method for manufacturing the cellular metal structures shown in FIGS. 4A and 4B.

In FIG. 6, the numeral 80A designates a mould in which expandable polymeric beads 82 are arranged. The beads 82 are of different sizes and arranged in a graduated array, as shown. The largest beads 82 form one layer and beads 82 of succesively smaller sizes are arranged in successive layers in the mould 80A. Alternatively, the different sized expandable polymeric beads 82 can be arranged randomly in the mould, and the numeral 80B designates a mould containing beads 82 of different sizes arranged randomly. The beads 82 are caused to expand and fuse, and after the moulding process is complete, a polymeric foam precursor 84 is provided formed of the foamed beads 82. The foam precursor 84 is substantially the same size and shape as the final cellular metal structure.

A metal material is then deposited or the foam precursor 84 for example by vapour phase deposition, as represented by the means labelled 86 in FIG. 6, to provide an intermediate product 88, comprising the foamed material on which is deposited the metal material. During the deposition of the material, the mould is rotated or represented by the arrow B to ensure uniform distribution of the metal material deposited thereon.

The intermediate product 88 is then subjected to removal step to remove the foam material therefrom. The removal of the foam material can be effected either by the application of heat to burn away the foam material, or by the application of a solvent to dissolve the foam material. The arrow C in FIG. 6 represents the application of heat or a solvent.

The remaining product is the final cellular metal product, i.e. the fan casing 30.

Figure 5:
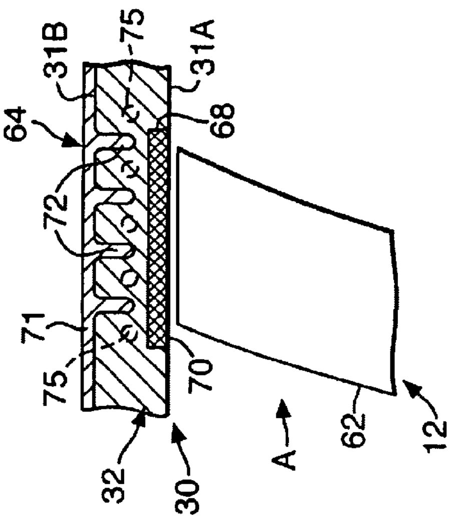

Referring to FIG. 5, there is shown a section of a fan casing 30 for the use as a containment for a fan blade 62, in the event of failure of the blade 62. The casing 30 shown in FIG. 5 comprises a main body 32 having containment means in the form of a containment ring 64 cast on the radially outer surface 31B of the main body 32. The containment ring 64 is formed of a suitable material for example a carbon fibre material, which may be kevlar. The radially inner surface 31A of the fan casing 30 defines an annular recess 68 which circumferentially surrounds the fan blades 62. An abradable lining 70 is plasma spray coated into the recess 68 to provide a seal for the air passing through the fan. The tips of the fan blades 62 cut their own clearance path through the abradable lining 70.

The containment casing 64 has a circumferentially and longitudinally extending containment member 71 and radially inwardly extending ribs 72, each of which may extend circumferentially around the fan 12. When a fan blade 62 fails, the part which breaks off passes through the main body 32 and its kinetic energy is absorbed by the cellular metal forming the main body 32. The broken part then strikes the ribs 72 of the containment casing 64 and is disintegrated into smaller parts. As an alternative, or in addition, to the ribs 72, cables (shown in broken lines and designated 75) or other circumferentially extending members are provided which are also capable of disintegrating a broken part of a failed blade 62. The broken parts of the failed fan blade 62 are then controlled or entrapped by the containment portion 71 of the containment ring 64.

Figure 7:
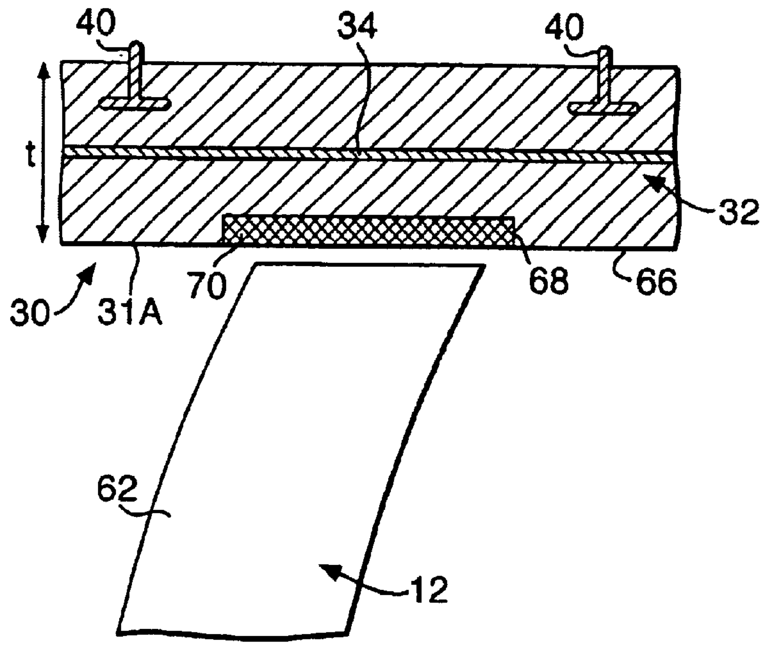
FIG. 7 is a sectional side view of a further embodiment of part of a casing for a fan of a gas turbine engine.

In another embodiment shown in FIG. 7, the main body has a radial thickness greater than the corresponding thickness of the main body of the embodiment shown in FIG. 5. The main body 32 also includes components 40 cast into the main body 32, which are intended for strengthening purposes, not blade containment purposes. In this embodiment the radial thickness of the main body 30 is calculated so that the main body 32 itself reduces the energy of a failed fan blade so that the broken part is captured and held inside the main body 30. An advantage of this is that in some known systems, the broken part of the fan blade 62 is destroyed by the construction of the containment means, as in the case of the embodiment shown in FIG. 5. With the use of the cellular metal of the main body 32 to capture the fan blade, it can be examined and analysed to find out the cause of the failure.

Figure 8A:
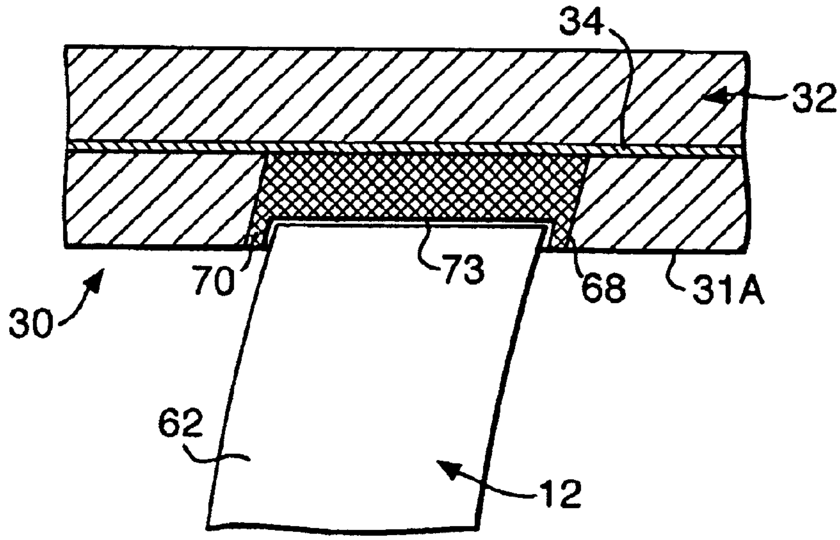
FIGS. 8A and 8B are sectional side views showing part of a casing extending around a fan showing respectively normal operation and operation after failure of a fan blade.
Figure 8B:
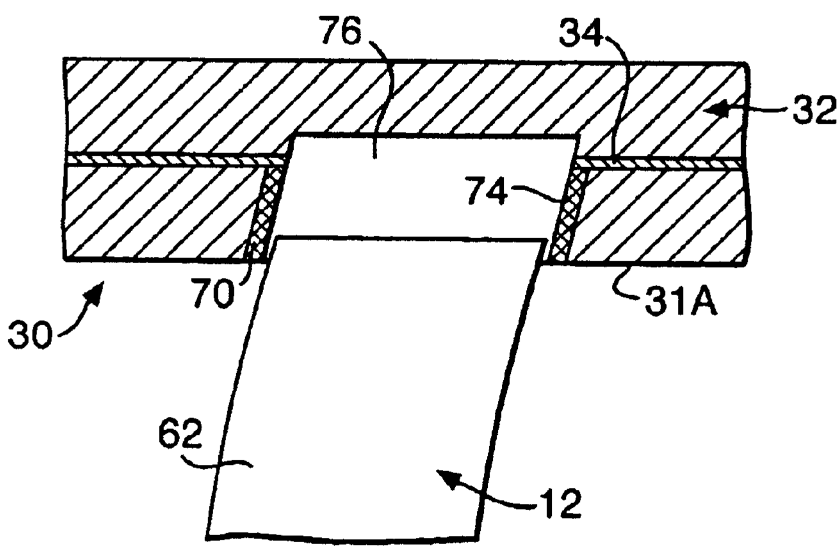

When a blade fails, the rotation of the fan 12 then becomes eccentric and tends to wear away one particular region of the abradable lining 70 and of the main body 32 of the casing as described below 30. This has the advantage which can be described as follows, with reference to FIGS. 8A and 8B. FIG. 8A shows the normal operation of a fan 12. As the blades rotate a circumferential track 72 is cut in the abradable material 70. Where there is a failure of a fan blade 62, it is often necessary for the engine 10 to be shut down. In such a situation, even though the engine is no longer in operation, the fan 12 may continue rotating because of the air driven through the engine by the forward motion of the aircraft. However, since such rotation of a fan with a broken fan blade 62 will be eccentric, and the eccentric rotation of the fan causes the blades 62 to wear away the cellular metal of the main body 32 of the casing 30 or a particular region of the casing 30 to create a worn recess 74, as shown in FIG. 8B. By allowing the eccentric rotation of the fan 12 to wear away the cellular metal of the main body 32 of the casing 30 a gap 76 is created between the tips of some of the fan blades 62 and the remaining part of the cellular metal in the region where this wearing occurs. This means that air which would pass through the fan 12 passes over the tips of the blades 62 through the gap 76 thereby reducing the amount of air to drive the fan 12 around. The foam 32 allows air to follow a radial and circumferntial path further reducing the driving force on the fan 12. Thus, the speed of the fan 12 is reduced.

It will be appreciated that the above constructions of casing surrounding a fan blade can also be used for casings surrounding compressor blades or turbine blades.

In FIGS. 8A and 8B, the abradable lining 70 is shown extending from the radially inner surface 31A of the casing 30 to the sound reducing larger 34. However, in FIG. 7 the abradable lining 70 is shown extending part way down from the radially inner surface 31A to the sound reducing layer 34. Either construction will work, but the arrangement shown in FIGS. 8A to 8B provides an advantage in that it would reduce vibration in the event of failure of a fan blade 62.

There is thus described a casing for a gas turbine engine which has the advantage of allowing noise reduction, can perform a blade containment function, can support accessories mounted thereon and can provide sealing for the air flow through the engine. The above described casing also has the advantage that it is of much lighter weight than known casings.

Cellular metal of the type described as regard to the above embodiments, can be manufactured in different ways. Examples of methods of manufacturing such cellular metals are described in U.K. Patent Specification No. 729339 and 829934.

One particular method of manufacturing a casing and in particular a containment casing according to a further aspect of the present invention is centrispinning. Centrispinning comprises pouring molten metal into a substantially axisymmetric mould. The mould is spun, generally about its axis, so that the liquid metal is drawn into the mould geometry by the action of centripetal forces. This means that hollow axisymmetric shapes (such as casings) can be manufactured readily. Important advantages are the external geometry is finished to a high standard and imperfections in the molten material are drawn to the bore of the shape where they are then easily machined away. The result is that the overall material properties are superior to normal casting. For certain metals it is necessary to use inert gas shielding or alternatively a vacuum melt as known in the art.

Generally homogeneous and isotropic metal foams are manufactured by raising the metal to melting temperature, and adding a foaming agent, or alternatively polymeric beads as hereinbefore described. It is preferable to use a foaming agent (as known in the art) so that when an appropriate temperature is reached the foaming agent foams and introduces bubbles into the molten metal. The temperature is then reduced while the bubbles are still formed, so that the metal solidifies with bubbles in place, thereby forming a cellular structure. The cellular structure may be either open celled or preferably closed celled.

Figure 9:
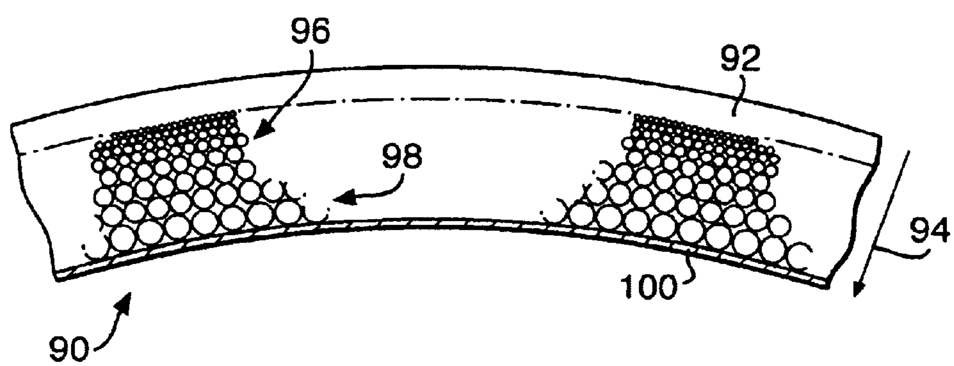

In a preferred manufacturing process of the present invention, the molten metal/foaming agent is additionally centrispun in its mould. As the mould is rotated, the centripetal force draws the denser material to the radially outer diameter, and forces the less dense, more cellular material to the bore as can be seen in FIG. 9. In this way, and in a preferred embodiment as shown in the FIG. 9, the radially outer diameter cools to give a solid material 92, small cells 96 locate generally in the mid section, and larger cells 98 locate towards the bore. However, the positioning of small-to-large cells forms a graduated density cellular structure 96, 98 decreasing in density towards the bore or direction shown by arrow 94. Preferably, the radially inner surface of the casing comprises a perforated facing sheet 100. The facing sheet 100 is bonded to the cellular structure and provides additional stiffness to the containment casing 90. Furthermore, the perforations in the facing sheet 100 allow acoustic pressure waves to penetrate and enter the cellular structure thereby attenuating noise.

This manufacture process is relatively inexpensive particularly so as the external shape and surface is substantially finished. Furthermore, there is significantly less waste material than conventional casting or forging manufacture processes as the machine finishing of the radially inner surface is done on the least dense cellular material 98.

Preferably the shape of the radially inner surface is machined to give an even and annular surface for minimum blade tip passing clearances. As the cellular material 98 is of relatively low density the machining operation is readily achieved in a rapid and low cost process. A further advantage of machining the radially inner surface is that the finished surface comprises exposing the cellular structure where there are various opening sizes leading to various cell sizes. This is highly advantageous as the open cells afford a broader frequency range of acoustic absorption than is currently possible using regularly sized honeycomb acoustic liners.

For fan blade impact resistance the graded size of cellular structure is advantageous. As a blade or part thereof, impacts the weaker, less dense foam this is relatively easily penetrated, undergoing significant plastic deformations, but as the blade moves through the cellular structure, the denser foam increases resistance. In this way, the blade impact is arrested gradually, so that peak stresses in the casing are kept at a lower level than would be the case where the metal foam is of a uniform density. This arrangement means that the impact has a longer duration, for the same amount of impulse, meaning that the peak forces are reduced.

Furthermore, the stresses have more time to distribute over a larger area, thereby providing more resistance to impact loads.

For more oblique impacts, such as blade root impacts, the change in density helps to affect a more gradual turning of the impact velocity in a circumferential direction 'parallel' with the casing thereby reducing the impulse energy of the blade that is a critical problem with containment casings. At the point of impact, the impactor (blade or part thereof) has a given momentum (normal and tangential to the surface of the casing). Resistance tangential to the casing is much less than that normal to the casing—due to the variation of foam density (and also due to the inherent stiffness of a cylindrical structure). This difference tends to deflect the impactor toward the tangential direction. With sufficient resistance the impactor would deflect sufficiently to stay within the cylinder, performing a generally spiral path within the casing, and remain embedded there. This turning means that more material can be involved in absorbing the impact energy, and reduces the size of the impact shock through the structure.

It should be understood to the skilled artisan that the present invention is equally applicable to any other casing in the engine such as for the compressors 13, 14 or turbines 16, 17, 18. For these embodiments, an additional advantage of the cellular metal containment casing is that it provides thermal insulation for the remainder of the engine against the high temperatures in the compressors and especially the turbines. Where the present invention is utilised the denser cellular structure and outer solid portion would provide the structural capacity of the casing, and the inner less dense foam would provide thermal insulation. Thus, the outer part of the casing would be generally cooler, or would need less cooling, so less material or lower temperature material could be used than for conventional casings.

Various modifications can be made without departing from the scope of the invention. For example, the different constructions described above could be combined with each other. A main body formed of a different sized cells as described in relation to FIGS. 4A and 4B could incorporate the strengthening components 40, 42 as described in relation to FIG. 2.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

What is claimed is:

1. A structural member comprising a main body and means for mounting the structural member on or around a further member characterized in that said main body is formed from a foamed cellular material, the structural member comprising barrier means on said main body to act as a barrier to flow of gas through said main body wherein the barrier means comprises a layer of a sound absorbing material.

2. A structural member according to claim 1 characterized in that the sound absorbing material is an elastomeric material.

3. A structural member according to claim 1 characterized in that the barrier means is a barrier to noise and comprises a sound absorbent arrangement of different sized cells of the cellular material.

4. A structural member according to claim 3 characterized in that the different sized cells are arranged in a graduated array of the different sizes of the cells.

5. A structural member according to claim 3 characterized in that the different sized cells are generally randomly arranged throughout the main body.

* * * * *